(12) United States Patent
Schultheis et al.

(10) Patent No.: US 9,487,429 B2
(45) Date of Patent: Nov. 8, 2016

(54) PLASMA DEPOSITION PROCESS FOR PRODUCING AN OPTICAL PREFORM WITH A CLADDING GLASS LAYER OF FLUORINE-DOPED QUARTZ GLASS

(75) Inventors: Andreas Schultheis, Langenselbold (DE); Karsten Bräuer, Bruchkoebel (DE); Richard Schmidt, Hammersbach (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 244 days.

(21) Appl. No.: 14/233,104

(22) PCT Filed: Jul. 26, 2012

(86) PCT No.: PCT/EP2012/064748
§ 371 (c)(1),
(2), (4) Date: Jan. 15, 2014

(87) PCT Pub. No.: WO2013/014258
PCT Pub. Date: Jan. 31, 2013

(65) Prior Publication Data
US 2014/0208802 A1  Jul. 31, 2014

(30) Foreign Application Priority Data
Jul. 27, 2011 (DE) .................. 10 2011 108 612

(51) Int. Cl.
C03B 37/014 (2006.01)

(52) U.S. Cl.
CPC ..... *C03B 37/0148* (2013.01); *C03B 37/01426* (2013.01); *C03B 2201/12* (2013.01); *C03B 2207/46* (2013.01); *C03B 2207/54* (2013.01); *C03B 2207/66* (2013.01)

(58) Field of Classification Search
CPC ............... C03B 37/0148; C03B 37/01426; C03B 2201/12; C03B 2207/46; C03B 2207/54; C03B 2207/66
See application file for complete search history.

(56) References Cited

U.S. PATENT DOCUMENTS 4,294,601 A * 10/1981 Dabby ............. C03B 37/01413
65/136.1
8,028,545 B2  10/2011 Petitfrere et al.
(Continued)

FOREIGN PATENT DOCUMENTS

DE  10 2005 015 706 A1  7/2008
EP     1 801 080 A1  6/2007
(Continued)

OTHER PUBLICATIONS

Espacenet English language abstract of DE 2005 015 706 Al, published Jul. 3, 2008.
(Continued)

*Primary Examiner* — Alison L Hindenlang
*Assistant Examiner* — Jerzi H Moreno Hernandez
(74) *Attorney, Agent, or Firm* — Tiajoloff & Kelly LLP

(57) ABSTRACT

In plasma deposition processes for producing an optical preform according to the POD method, a cladding glass layer composed of fluorine-doped quartz glass is produced by means of a plasma torch on a cylindrical substrate body composed of quartz glass, said substrate body rotating about the longitudinal axis thereof. In this case, the plasma torch performs a reversing relative movement between two turning points (A; B) along the substrate body. In order, proceeding therefrom, to achieve a high fluorine doping in conjunction with a dopant distribution that is as uniform as possible axially, the invention proposes that a heat element has a heating effect on the region of one turning point (A; B) when the plasma torch is situated in the region of the other turning point (B; A).

19 Claims, 1 Drawing Sheet

(56) References Cited

U.S. PATENT DOCUMENTS

| | | | |
|---|---|---|---|
| 2005/0257571 A1* | 11/2005 | Koaizawa | C03B 37/0146 65/397 |
| 2006/0213228 A1* | 9/2006 | Schotz | C03B 37/01211 65/377 |
| 2007/0163299 A1 | 7/2007 | Petitfrere et al. | |
| 2008/0053155 A1 | 3/2008 | Shah | |
| 2008/0295541 A1 | 12/2008 | Otosaka | |
| 2009/0260400 A1* | 10/2009 | Schoetz | C03B 37/01426 65/391 |
| 2010/0034998 A1* | 2/2010 | Schoetz | C03B 37/01426 428/34.4 |
| 2010/0162768 A1 | 7/2010 | Otosaka | |
| 2011/0177333 A1* | 7/2011 | Schoetz | C03B 37/01426 428/376 |

FOREIGN PATENT DOCUMENTS

| | | | |
|---|---|---|---|
| EP | 1 997 783 A2 | 12/2008 | |
| EP | 2 206 689 A1 | 12/2009 | |
| EP | 2206689 A1 | 7/2010 | |
| JP | H 1072231 A | 3/1998 | |
| JP | 2005-200265 A | 7/2005 | |
| JP | 2010 155731 A1 | 7/2010 | |
| WO | 2006 106068 A2 | 10/2006 | |

OTHER PUBLICATIONS

Espacenet English language abstract of JP 2005-200265 A, published Jul. 28, 2005.

Espacenet English-language abstract of JP 2010 155731(A). Method and Apparatus for Manufacturing Optical Fiber Preform Using High Frequency Induction Thermal Plasma Torch. Shin Etsu Chemical Co., Jul. 15, 2010.

Espacenet English-language abstract of JPH 1072231(A). Apparatus for Producing Optical Fiber Preform and Production Thereof. Sumitomo Electric Industries, Mar. 17, 1998.

* cited by examiner

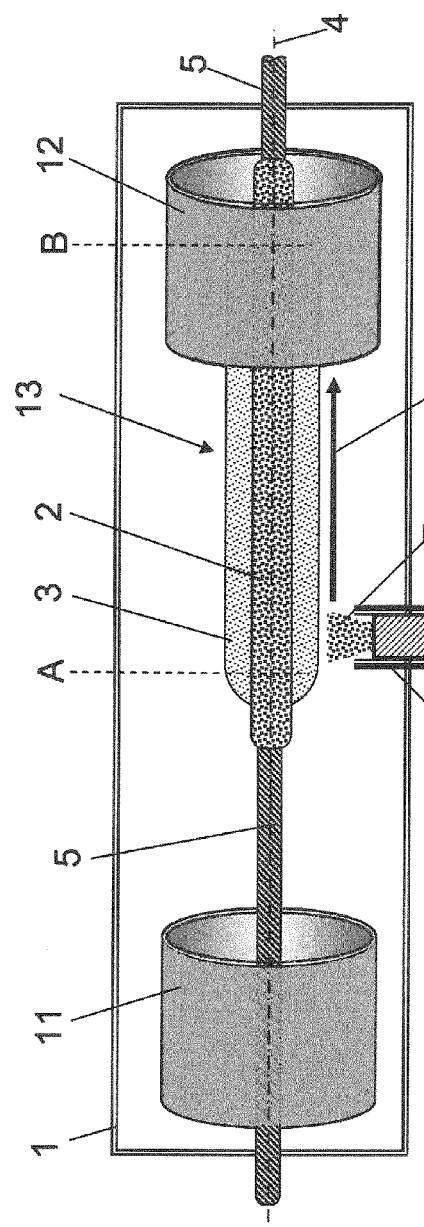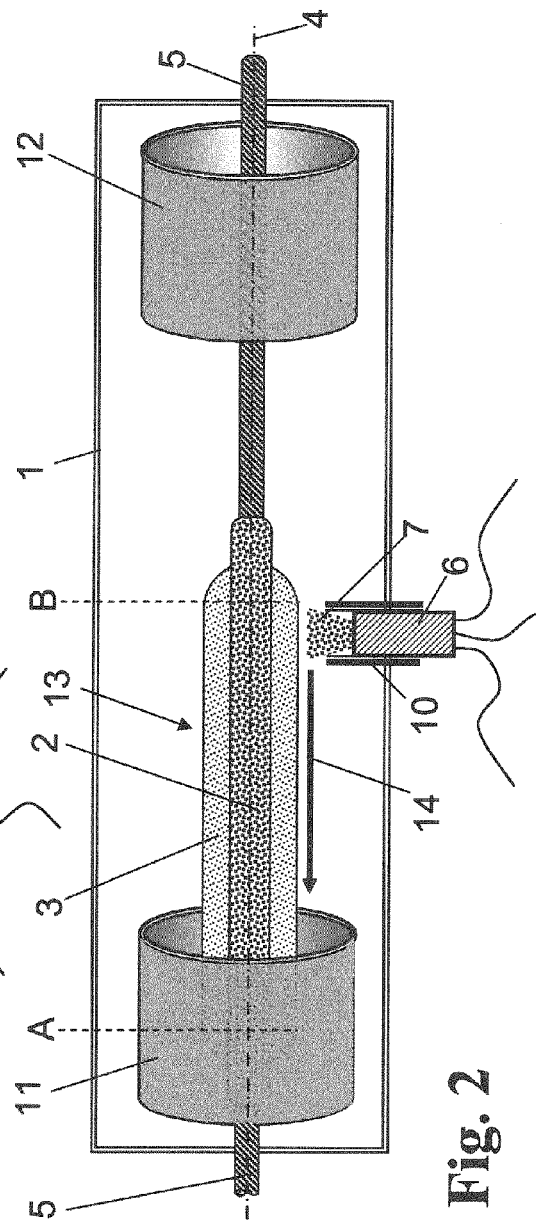

PLASMA DEPOSITION PROCESS FOR PRODUCING AN OPTICAL PREFORM WITH A CLADDING GLASS LAYER OF FLUORINE-DOPED QUARTZ GLASS

DESCRIPTION

The present invention refers a plasma deposition process for producing an optical preform comprising a cladding glass layer of fluorine-doped quartz glass, in that $SiO_2$ particles are formed by means of a plasma torch in the presence of fluorine and are deposited layer by layer on the cylinder outer surface of a cylindrical substrate body of quartz glass that is rotating about its longitudinal axis, and are vitrified to form the cladding glass layer, with the plasma torch and the substrate body being moved relative to each other such that the plasma torch reversingly moves between two turning points along the substrate body.

The turning points of this relative movement of substrate body and plasma torch at both sides substantially define the face ends of the cladding glass layer.

1. Prior Art

For the production of a preform for optical fibers by means of the so-called POD (plasma outside deposition) method a cladding glass layer of fluorine-doped quartz glass is e.g. produced on the cylinder outer surface of a core rod of quartz glass. For this purpose a plasma torch is used that is fed with a silicon compound, oxygen and a fluorine compound and is reversingly moved along the core rod rotating about its longitudinal axis. Fluorine-doped $SiO_2$ which is deposited layer by layer on the core glass and thereby directly vitrified with formation of the fluorine-containing $SiO_2$ cladding glass layer is formed by reaction of the start substances in the plasma flame.

As a rule, the core rod has a radially homogeneous refractive index profile. It consists mostly of undoped quartz glass, but may also contain dopants changing the refractive index. The doping of the cladding glass layer with fluorine causes a decrease in the refractive index as compared with undoped quartz glass and thus a refractive index difference $\Delta n$ between the core glass and the cladding glass. A high refractive index reduction requires considerable fluorine doping. This is accomplished in that the cladding glass layer is directly vitrified during deposition, and the slightly diffusing fluorine is thereby enclosed in the quartz glass.

Such a POD method for producing a preform is e.g. described in DE 2005 015 706 A1 and EP 1 997 783 A2. The deposition process is carried out within a vertically oriented chamber with movable core rod which is moved upwards and downwards along its entire length to be coated along the stationary plasma torch. Fluorine-doped $SiO_2$ is deposited layer by layer on the core rod and vitrified by means of the plasma flame directly into the cladding glass layer.

It is reported that fluorine doping depends on the temperature of the core rod (the deposition surface) and is decreasing with an increasing temperature of the core rod. The reduction of the core rod temperature is however restricted by the demand for a direct vitrification of the deposited cladding glass layer.

Moreover, due to the reversing relative movement of the plasma torch in the area of the core rod ends the core rod is swept over twice in directly successive order with the plasma flame, resulting in a temperature rise as compared with the core rod center. To minimize the accompanying fluctuation of the fluorine doping in axial direction and to increase the refractive index difference $\Delta n$ on the whole, it is suggested that during the backward movement of the plasma torch from a core rod end either the supply rate of the start material should be reduced or the feed speed of the plasma torch should be increased.

Another method for achieving axially homogeneous fluorine doping in a POD method is known from JP 2005-200265 A. It is suggested that the temperature at the point of impingement of the plasma flame should be measured continuously and kept at a predetermined value. The distance of the plasma flame from the core rod serves here as a control parameter of the temperature regulation.

2. Technical Objective

During the relative movement of the plasma torch in the POD process the plasma flame is reversingly sweeping over the core rod from one turning point to the other, thereby heating the core rod locally. The unheated longitudinal sections cool down in relative terms. In the central section the two heating phases are interrupted during the reciprocating movement by cooling phases having each the same duration. By contrast in the end portions two heating phases follow each other quickly (during the reciprocating movement), separated by a long cooling phase until the next heating-up process. The end portions are therefore subjected on the one hand to a relatively strong cooling action during the relatively long cooling phase and on the other hand to relative overheating due to the short time sequence of the two heating phases.

Viewed over the duration of the deposition process, the temperature history in the end portions of the core rod is therefore entirely different from that in the central portion.

By contrast, if one looks at one movement cycle only, a temperature gradient is obtained over the whole length of the core rod that is defined by the maximum temperature due to the double heating at one turning point and the minimum temperature simultaneously prevailing at the other turning point of the reversing relative movement. To achieve an axially homogeneous fluorine doping, the known POD methods aim at a homogenization of the axial temperature profile in that the action of the plasma flame in the area of the turning points is reduced, at the same time under the premise that the core-rod temperature is kept as low as possible to promote the incorporation of fluorine.

However, an excessively low temperature of the core rod in the deposition process may cause the cracking of the preform and thus cause total failure. The reason is that it poses not only the risk of an inadequate vitrification of the cladding glass layer, but in combination with the axial temperature gradient also the risk of an inadequate relaxation of the mechanical stresses caused by the manufacturing process. On account of the increasing differences in the thermal expansion coefficients of core glass and cladding glass with increasing fluorine doping, this risk is increasing with an increasing $\Delta n$.

It is therefore the object of the present invention to indicate a POD method for producing a preform which is distinguished by high fluorine doping with a dopant distribution that is as uniform as possible axially.

GENERAL DESCRIPTION OF THE INVENTION

Starting from the aforementioned method, this object is achieved according to the invention in that a thermal element thermally acts on the area of the one turning point when the plasma torch is positioned in the area of the other turning point.

To achieve a flattening of the axial temperature gradient in the POD process, the above-mentioned prior art suggests a local reduction of the action of the plasma flame in the area of the turning points of the torch movement. The reduced action of the plasma flame leads to a reduction of the temperature in the area of the currently involved turning point and is substantially noticed as a reduction of the maximum temperature of the axial temperature gradient. The temperature at the other turning point as well as the minimum temperature of the axial temperature gradient are thereby not influenced or are influenced insignificantly.

The present invention chooses a different way. It is suggested that an excessive cooling of the preform in the area of the one turning point of the torch movement should be counteracted when plasma deposition takes place in the area of the other turning point, or vice versa. This is accomplished in that the respectively cooling end of the preform is exposed to the temporary or permanent action of a direct or indirect heating. Direct heating is achieved by way of a heating element; indirect heating by heat output from a thermal store or by reflection of a thermal radiation reflector. The composite structure of substrate body and cladding glass layer is here called "preform"—though the cladding glass layer is not completely formed yet.

At any rate the heating operation acts on the one end of the preform at least whenever plasma deposition takes place in the area of the other end, and it counteracts a cooling of said end insofar as the temperature thereof is higher than would be without the action of the heating operation. Hence, in the method according to the invention the axial temperature gradient is reduced in that the minimum temperature thereof is increased (as compared with the standard method without heating of the end portions).

Apart from the desired flattening of the axial temperature gradient and the accompanying approximation of the temperature histories of center and end portions of the preform, this measure has also another important effect:

The mean temperature of the preform is kept at a higher level than would be the case without heating in the area of the turning points of the torch movement. During deposition the preform has a relatively higher temperature than in the standard POD process without the use of the thermal element not only in the area of the turning points, but on the whole and in every local area of the deposition. This reduces the radial temperature gradient.

Moreover, the following effect is observed: The heat amount needed for vitrifying the cladding glass layer is provided by the locally existing residual heat of the preform, particularly the cladding glass layer, and the additional local heat input by the plasma flame. With an increased residual heat, the heat amount to be input by the plasma flame and thus the temperature of the plasma flame can be correspondingly smaller.

This correlation is advantageously exploited in the method according to the invention, for it has surprisingly been found that it is not or at any rate not exclusively the temperature of the substrate body and of the already produced cladding glass layer, respectively, that is decisive for the degree of the fluorine incorporation into the quartz glass, but (also or even primarily or exclusively) the temperature of the plasma flame. Under the boundary condition of a complete vitrification the higher mean temperature and residual heat of the cladding glass layer in the area of the turning points makes it possible to reduce the temperature of the plasma flame as compared with the standard deposition process.

It is thereby possible to achieve a surprisingly high fluorine concentration in the quartz glass of the cladding glass layer, which with respect to undoped quartz glass accomplishes a refractive index reduction $\Delta n$ of more than $27 \times 10^{-3}$, preferably of at least $30 \times 10^{-3}$. Despite the accompanying differences of the thermal expansion coefficient of substrate body and cladding glass layer, the risk of failure due to stress cracks can be considerably reduced because of the simultaneously small flat axial temperature gradient.

The surprisingly higher loading degree with fluorine is probably due to the comparatively lower temperature of the plasma flame and the lower risk of failure might be due to the flatter axial and radial temperature gradient and the adaptation of the thermal history over the length of the preform.

The first-mentioned effect occurs whenever the cladding glass layer is additionally heated over its whole length and thereby has a higher "residual heat". However, it has turned out to be more advantageous when the action of the thermal element is restricted to the end portion of the cladding glass layer and is variable in time in the sense that the degree of the action of the thermal element on the area of the one turning point is smaller the farther away the plasma torch is from the other turning point.

An overheating at the ends of the cladding glass layer—i.e. in the area of the turning points of the torch movement—is thereby counteracted. The reason is that while the plasma torch is moving away from the rear turning point and towards the front turning point, the latter is permitted to cool off at a faster pace due to the continuously or stepwise decreasing action of the thermal element. Finally, when the plasma torch reaches the area of the front turning point, the same is cooled down due to the preceding elimination of the action of the thermal element, so that the double heating by the reciprocating movement of the plasma torch, especially in the case of a comparatively colder plasma flame, is less noticeable than would be the case with a permanent action of the thermal element. At the same time another thermal element or the same thermal element acts on the other end of the cladding glass layer, thereby counteracting an unrestrained cooling at that place. Ideally, whenever the plasma torch is positioned in the area of one turning point, the thermal element does not act or only acts less on the area of this turning point.

The thermal element is optionally switched off or reduced in its heating capacity, or it is spaced from the corresponding turning point, so that it can thermally act at best from a distance and to a smaller degree on said point.

As for doping with fluorine that is as high as possible together with a homogeneous axial and radial fluorine distribution, it has turned out to be particularly advantageous when a surface temperature of the cladding glass layer of at least 650° C., preferably at least 750° C., is maintained through the heating action of the thermal element in the area of the one turning point.

The action of the thermal element can be shifted from one turning point to the other turning point. Preferably, however, thermal elements are used that are arranged at both sides relative to the plasma torch, and of which each is assigned to a turning point.

At least one individual thermal element is here assigned to each turning point of the plasma torch movement. These are arranged at a predetermined distance from the plasma torch and subjected to the same relative movement along the longitudinal axis of the substrate body as the torch. As soon as the plasma torch has reached a turning point, the thermal element assigned to said turning point is positioned outside an effective area of action, whereas the other thermal element is positioned at the other turning point (or in the vicinity thereof) and is thermally acting thereon.

The thermal element may be configured as an active heat source, such as an additional burner or an electrical heater. To counteract an excessively unrestrained cooling in the area of the ends of the cladding glass layer, it is however enough when simple passive elements, such as a thermal store or a thermal radiation reflector, are used as the thermal element.

When passive components are used, the thermal action on the cladding glass layer is restricted to the reduction of an unrestrained outflow of heat. A separate supply of the thermal element with combustible media or with electrical energy is not needed.

It is also advantageous particularly for the generation and maintenance of a flat temperature gradient in the case of very long cladding glass layers when the thermal store or the thermal radiation reflector is a passive element that is heated by a heat source.

The heat source is preferably a burner which is acting on the thermal element. It is thereby possible to produce and maintain not only a temperature at the turning points that is higher in comparison with passive thermal insulation, but also a temperature which is better defined and counteracts random temperature fluctuations and enables a reproducible deposition process.

A quartz glass tube is preferably used as the passive thermal element that is surrounding the substrate body in the area of the turning point when the plasma torch is positioned in the area of the other turning point.

Quartz glass is thermally stable and chemically inert with respect to the preform to be produced. Tubes or tube sections of quartz glass can envelope the hot ends of the preform, thereby effecting—without any additional measures—a heat accumulation which counteracts unrestrained cooling in the enveloped areas.

An improvement of its heat-reflecting action is achieved when the quartz glass tube comprises an at least partly opaque wall that is acting as a diffusing reflector for thermal radiation.

The quartz glass tube acts as a diffusing reflector when it consists of opaque quartz glass or when it comprises at least an opaque surface layer. The diffusing reflection produces a thermal action on the area of the cladding glass layer enveloped by the quartz glass tube.

The opaque quartz glass is distinguished by a high chemical and thermal resistance and has a degree of reflection of more than 60% (measured in an integrating sphere and based on the reflectivity of the standard material "Spectralon") in the infrared wavelength spectrum (at a measurement wavelength of 1 μm).

It has turned out to be advantageous when the cladding glass layer extends into the quartz glass tube with a length corresponding to not more than 80%, preferably less than 60%, of its total length.

A respective quartz glass tube is here assigned as a passive thermal element to both ends of the cladding glass layer. In the case of a moved substrate body and locally fixed quartz glass tubes and also in the case of a stationary substrate body and quartz glass tubes that during the deposition process are movable along the cladding glass layer, these jointly cover not more than 80% of the total length of the cladding glass layer. The length of the quartz glass tubes and their distance from one another has here been chosen such that they never cover more than 80%, preferably less than 60%, of the total length of the cladding glass layer.

The particularly hot longitudinal section of the cladding glass layer acted upon by the plasma flame is here always free of quartz glass tubes, so that the thermal action of the quartz glass tube is restricted to less hot areas of the cladding glass layer or to the end portions thereof.

Here, the quartz glass tube or quartz glass tubes have an inner diameter which is not more than 200 mm, preferably not more than 120 mm, greater than the outer diameter of the substrate body.

The dimensions have been chosen such that an annular gap of less than 100 mm, preferably less than 60 mm, remains at the beginning of the deposition process between substrate body and quartz glass tube. Especially in the case of passive thermal elements, such as quartz glass tubes, the action with respect to thermal storage or thermal radiation reflection depends on the gap width between cladding glass layer and quartz glass tube. In the course of the deposition process the thickness of the cladding glass layer is increasing and the annular gap width is thus decreasing. Annular gap widths of 100 mm at the beginning of the deposition process result in a low thermal action on the cladding glass layer in the area of the turning point of the torch movement.

Since the thermal insulation by the quartz glass tube is the better the smaller the remaining annular gap is between quartz glass tube and cladding glass layer, the quartz glass tube preferably has an inner diameter which is not more than 3 times, preferably not more than 2 times, the maximum outer diameter of the cladding glass layer.

The cladding glass layer achieves its maximum outer diameter towards the end of the POD process.

Preferably, the substrate body is arranged with a horizontally oriented longitudinal axis.

In the case of a longitudinal axis which is arranged perpendicular or inclined to the horizontal, heat convention automatically contributes to the axial temperature gradient in the deposition process. This contribution is ruled out in the case of a horizontal arrangement of the substrate body.

As has been explained above, the ends of the cladding glass layer in a preferred procedure are enveloped by a tube or they are kept at an elevated temperature. These measures are basically known from other prior art.

For instance, EP 1 801 080 A1 describes a plasma spray method in which prefabricated quartz glass particles or quartz particles made from natural raw material are sprayed onto the cladding surface of a preform by using a reversingly moved plasma torch. To keep away contamination particles from the just sprayed-on and still soft glass layer, the layer is shielded from the environment by means of gas-purged cladding tubes composed of quartz glass or stainless steel. In the preferred case it is only the direct deposition area that is without the cladding tubes. To prevent excessive cooling of the cladding glass layer by the purge gas, the gas is preheated to a temperature between 300° C. and 600° C.

The cladding tubes cover between 0.3-0.8 times the length of the preform. In the case of a preform diameter of 100 mm the cladding tubes have an inner diameter of 150 mm.

During plasma spraying a thicker glass layer is normally produced in a spraying cycle than in a POD cycle (with typical layer thicknesses of about 20 μm). Due to the increased layer thicknesses in the plasma spraying process the freshly produced surface is soft for a longer time, which entails the risk of the fusion of particles from the environment. EP 1 801 080 A1 solves this problem by shielding the fresh surface by means of gas-purged cladding tubes. A cooling of the freshly produced surface by the purge gas is here desired and readily accepted (up to a temperature of up to 300° C.). The problems posed by homogenous and high fluorine doping of quartz glass as in the case of the present invention do not arise in plasma spraying and they could also not be solved by the known procedure because of the rather cooling than heating effect of the cladding tubes.

As for the production of preforms from synthetic quartz glass, so-called "soot methods" are also known, in which $SiO_2$ particles produced by flame hydrolysis or oxidation are deposited on a mandrel to form a porous $SiO_2$ soot body. The soot body is mechanically less stable and tends to crack. That is why the ends of the soot body are often additionally densified. Such a method is known from US 2008/0053155 A1. To avoid cracking particularly in large soot bodies, it is suggested that the ends of the $SiO_2$ soot body should be permanently heated by an additional heater, so that the temperature does there not fall below 700° C. The action of the additional heater is permanent and is also maintained in a soot deposition process in the end portion of the soot body.

In this procedure, too, the measure to keep the ends of the soot body at an elevated temperature does not serve the purpose of a high and homogeneous doping with fluorine. It does not follow therefrom that this measure could have any influence on fluorine doping in a plasma deposition process.

EMBODIMENT

The invention shall now be explained in more detail with reference to embodiments and a patent drawing. In a schematic illustration and in detail, FIG. 1 shows an apparatus for producing a preform according to the POD method according to the invention; and FIG. 2 shows the apparatus of FIG. 1 in a later process stage.

FIG. 1 schematically illustrates a method for producing a preform for so-called multimode fibers with a step-like refractive index profile. In a deposition chamber 1, a core rod 2 of undoped synthetic high-purity quartz glass with a diameter of 65 mm and a length of 600 mm is coated by means of a POD method with a cladding glass layer 3 of fluorine-doped quartz glass. The core rod 2 is held with a horizontally oriented longitudinal axis 4 by means of holding tubes 5, which are welded on at the face side, in the chucks of a glass lathe (not shown). With the help of the glass lathe the core rod 2 is rotatable not only about its longitudinal axis 4, but can also be reversingly reciprocated along the longitudinal axis 4.

A left-side muffle tube 11 and a right-side muffle tube 12 are stationarily arranged inside the deposition chamber 1 and at both sides of the plasma torch 6. The muffle tubes 11, 12 are open at both sides and their center axes extend in a direction coaxial to the longitudinal axis 4 of the core rod. The two muffle tubes 11, 12 are identically configured; they consist of opaque quartz glass; they have an inner diameter of 170 mm, a wall thickness of 20 mm, and a length of 500 mm. At a measurement wavelength of 1 μm the opaque quartz glass shows a reflection degree of about 65% (based on the material "Spectralon"). The center distance of the muffle tubes 11; 12 relative to each other is 760 mm.

The plasma torch 6 is fed with $SiCl_4$, oxygen and $SF_6$ as start substances, and these are converted in a torch flame 7 assigned to the plasma torch 6 into $SiO_2$ particles. The plasma flame 7 is produced inside a torch tube 10 of quartz glass, which is surrounded by a high-frequency coil. At the beginning of the deposition process a distance of 80 mm is set between the torch tube 10 and the core rod 2.

The method according to the invention for producing a preform shall now be explained in an exemplary manner with reference to the apparatus shown in FIGS. 1 and 2.

The core rod 2 which is rotating about its longitudinal axis 4 is reversingly reciprocated at a translation speed of 500 mm/min along the plasma torch 6. $SiO_2$ particles are deposited layer by layer on the cylinder outer surface of the core rod 2 in this process. Each deposited layer is vitrified by means of the plasma flame 7 directly into the fluorine-containing quartz glass. The composite structure consisting of core rod 2 and cladding glass layer 3 is here called preform 13—though it has not been completely formed yet. The ends of the cladding glass layer 3 conform to those of the preform 13.

The core rod movement is reversed whenever one of the turning-point positions A, B of the preform 13 has reached the plasma torch 6. The turning points A, B are thus fixedly assigned to the preform 13 and move with the same along the longitudinal axis 4. The distance of the turning points A and B from each other corresponds approximately to the useable length of the preform 13 (without conical end caps of the cladding glass layer 3) and is 600 mm. The outer diameter of the preform after completion of the deposition process is 80 mm.

During the deposition process the plasma flame 7 is sweeping over the core rod 2 and the already produced cladding glass layer 3, respectively, from the turning point A to the turning point B and back, thereby effecting a local temperature rise. The axial temperature gradient developing over the length of the preform 13 has reached its maximum when the plasma flame 7 is positioned in the area of one of the turning points A, B. The opposite end of the preform 13 is cooling off in this process, but still shows a high residual heat.

The muffle tubes 11, 12 arranged at both sides of the plasma torch 6 serve, on the one hand, to flatten said axial temperature gradient and, on the other hand, to increase the mean temperature of the preform 13. The latter permits a reduction of the temperature of the plasma flame 7.

The muffle tubes 11, 12 are not additionally heated. In an alternative procedure, the muffle tubes are kept at a temperature of about 1000° C. by means of oxyhydrogen burners directed thereto.

In the process stage shown in FIG. 1, the plasma flame 7 is approaching the end of the preform 13 to which the turning point A is assigned. The directional arrow 14 shows the further direction of movement of the preform 13 until turning point A is reached. The opposite preform end already projects to some extent into the right-side muffle tube 12. When the turning point A is reached, the preform 13 projects over a length of 400 mm into the muffle tube 12; the direction of movement is subsequently reversed.

FIG. 2 shows the process stage in which plasma deposition is carried out in the area of the other turning point B. The directional arrow 14 shows the further direction of movement of the preform 13 until said turning point B is reached. The opposite preform end is here already projecting into the left-side muffle tube 11, the maximum penetration depth being also 400 mm at this side, namely as soon as the plasma flame 7 has reached the turning point B. The muffle tubes 11; 12 are spaced apart from each other to such an extent that whenever the preform 13 is positioned with one end inside one of the muffle tubes 11; 12, the other is completely positioned outside the other muffle tube 11; 12.

The muffle tubes 11; 12 keep the residual heat of the respective preform ends in that they act as a thermal radiation reflector and as a thermal store. In this way the respective end of the preform 13 that is not heated by the plasma flame 7 at the moment and is therefore cooling down considerably is temporarily exposed to the action of an indirect heating (by heat output or heat reflection), which counteracts a rapid cooling of the preform end concerned, and a comparatively flat axial temperature gradient is set. The temperature at the turning points A, B never decreases to less than 750° C.

Moreover, the mean temperature of the preform 13 is kept during the deposition process on the whole, i.e. over its whole length, at a higher level than would be the case without the muffle tubes 11; 12. Thus the preform 13 has a relatively higher temperature, so that the heat contribution to be made by the plasma flame 7 to the vitrification of the cladding glass layer 3 can be smaller.

This manifests itself in that in the above-explained embodiment of the invention a performance of the plasma torch 6 that is reduced by 10% is needed for vitrification, as compared with the standard deposition process without use of the muffle tubes 11; 12.

This leads to a surprisingly high fluorine doping of the quartz glass of the cladding glass layer 3, which is suited for effecting a refractive index reduction $\Delta n$ of $30\times10^{-3}$ in comparison with the undoped quartz glass of the core rod 2. Despite this high $\Delta n$ value, the failure rate due to tearing or cracking of the preform could be reduced by almost 100%.

The preform obtained according to the method of the invention consists of a core composed of pure quartz glass having a refractive index at 633 nm of 1.4571, and of a cladding of fluorine-doped quartz glass which at a wavelength of 633 nm has a refractive index of 1.4271. The mean fluorine content of the cladding glass is about 7% by wt. The content of hydroxyl groups in the core is 0.1 wt. ppm.

The invention claimed is:

1. A plasma deposition process for producing an optical preform having a cladding glass layer of fluorine-doped quartz glass, said method comprising:
    forming $SiO_2$ particles with a plasma torch in the presence of fluorine, and
    depositing said $SiO_2$ particles layer by layer on an outer surface of a cylindrical substrate body of quartz glass rotating about a longitudinal axis thereof, and
    vitrifying said $SiO_2$ particles so as to form the cladding glass layer,
    the plasma torch and the substrate body being moved relative to each other such that the plasma torch reversingly moves between first and second turning points along the substrate body,
    wherein each of said deposited layers is vitrified by the plasma torch directly into the fluorine-doped quartz glass; and
    wherein a thermal element thermally acts on an area of the first turning point when the plasma torch is positioned in an area of the second turning point.

2. The deposition process according to claim 1, wherein the thermal element has a degree of action on the area of the first turning point that decreases when a distance of the plasma torch from the second turning point increases.

3. The deposition process according to claim 2, wherein whenever the plasma torch is positioned in the area of the first turning point, the thermal element does not act or acts less on the area of said first turning point.

4. The deposition process-according to claim 1, wherein the thermal action of the thermal element in the area of the first turning point maintains a surface temperature of the cladding glass layer of at least 650° C.

5. The deposition process according to claim 1, wherein a second thermal element is arranged at an opposite side of the plasma torch relative to the first thermal element, and each thermal element is assigned to a respective one of the turning points, and said second thermal element thermally acts on the area of the second turning point when the plasma torch is positioned in the area of the first turning point.

6. The deposition process according to claim 1, wherein the thermal element comprises a thermal store or a thermal radiation reflector.

7. The deposition process according to claim 6, wherein the thermal store or the thermal radiation reflector is a passive element that is heated by a heat source.

8. The deposition process according to claim 6, wherein the thermal store or thermal radiation reflector comprises a quartz glass tube, said quartz glass tube surrounding the substrate body in the area of the first turning point when the plasma torch is positioned in the area of the second turning point.

9. The deposition process according to claim 8, wherein the quartz glass tube comprises at least one partly opaque wall that acts as a diffusing reflector for thermal radiation.

10. The deposition process according to claim 8, wherein the cladding glass layer extends into the quartz glass tube a length that is not more than 80% of a total length of the cladding glass layer.

11. The deposition process according to claim 8, wherein the substrate body has an outer diameter and the quartz glass tube has an inner diameter, and the inner diameter of the quartz glass tube is 200 mm or less greater than the outer diameter of the substrate body.

12. The deposition process according to claim 8, wherein the quartz glass tube has an inner diameter which is not more than 3 times a maximum outer diameter of the cladding glass layer.

13. The deposition process according to claim 1, wherein the longitudinal axis of the substrate body is arranged horizontally.

14. The deposition process according to claim 1, wherein a fluorine content that in comparison with undoped quartz glass effects a refractive index reduction $\Delta n$ of at least $27\times10^{-3}$ is set in the quartz glass of the cladding glass layer.

15. The deposition process according to claim 1, wherein the thermal action of the thermal element in the area of the one turning point maintains a surface temperature of the cladding glass layer of at least 750° C.

16. The deposition process according to claim 8, wherein the cladding glass layer extends into the quartz glass tube a length that is less than 60% of a total length of the cladding glass layer.

17. The deposition process according to claim 8, wherein the substrate body has an outer diameter and the quartz glass tube has an inner diameter, and the inner diameter of the quartz glass tube is 120 mm or less greater than the outer diameter of the substrate body.

18. The deposition process according to claim 8, wherein the quartz glass tube has an inner diameter which is not more than 2 times a maximum outer diameter of the cladding glass layer.

19. The deposition process according to claim 1, wherein a fluorine content that in comparison with undoped quartz glass effects a refractive index reduction $\Delta n$ of at least $30\times10^{-3}$ is set in the quartz glass of the cladding glass layer.

* * * * *